June 30, 1931. F. T. McDONOUGH ET AL 1,812,353
BALANCING MACHINE
Original Filed May 2, 1924 4 Sheets-Sheet 1
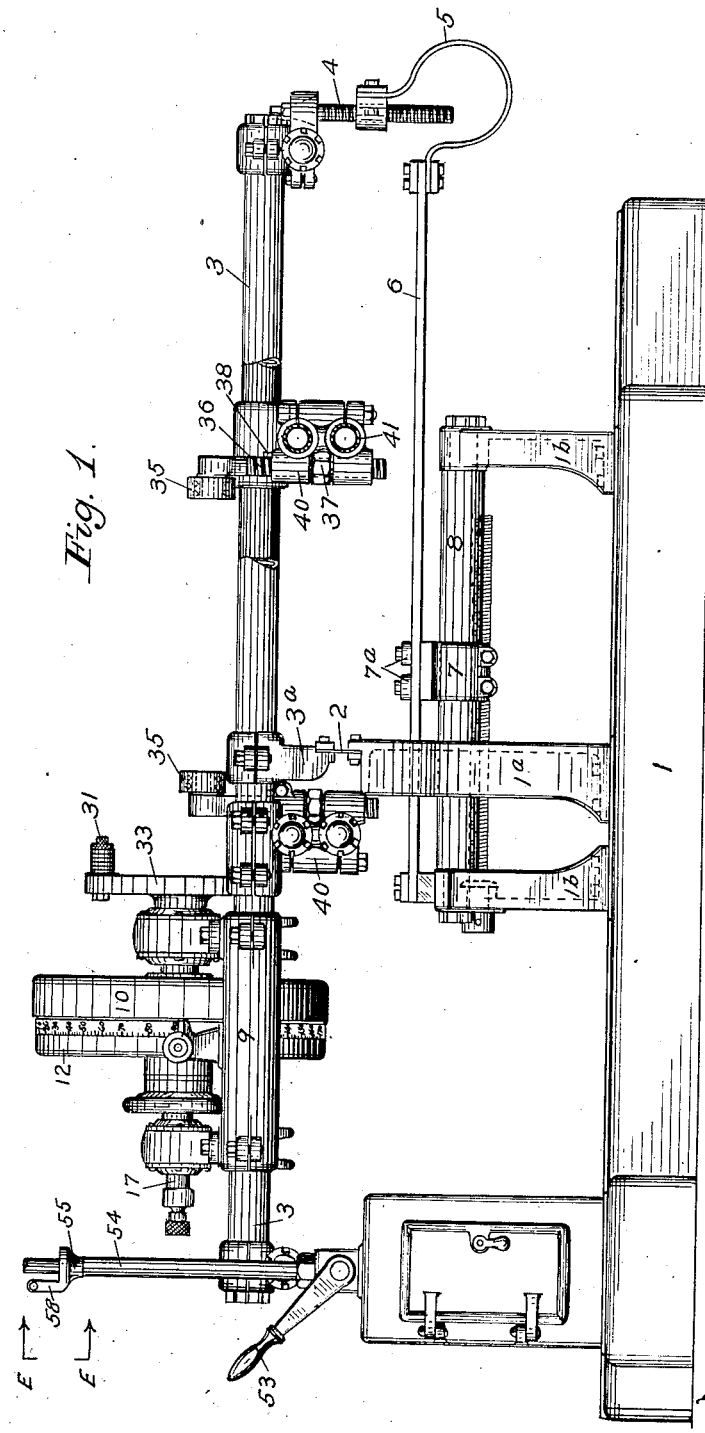
Inventors
FRANCIS T. McDONOUGH
AMOS F. MOYER
By Paul, Paul & Moore
Attorneys

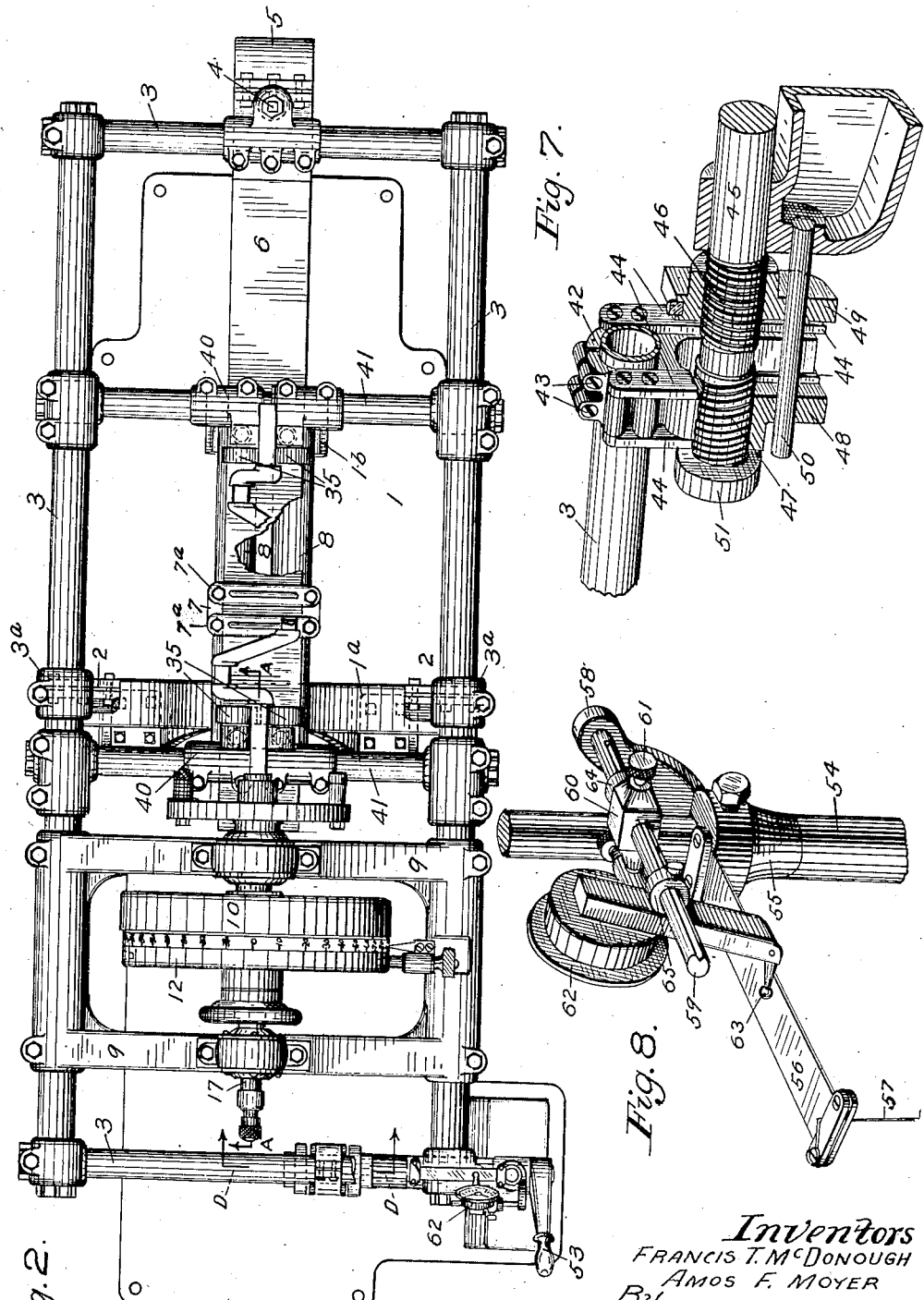

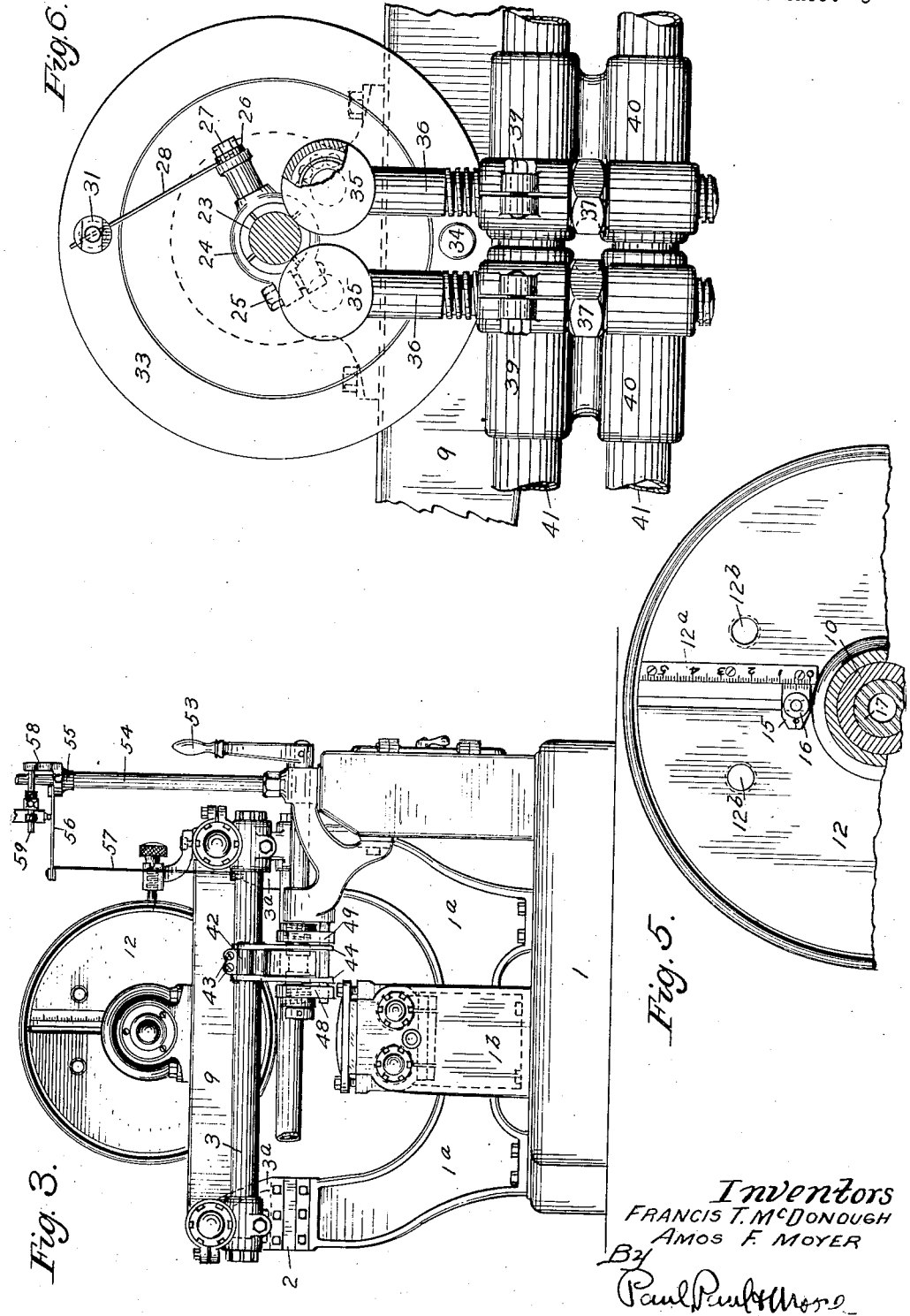

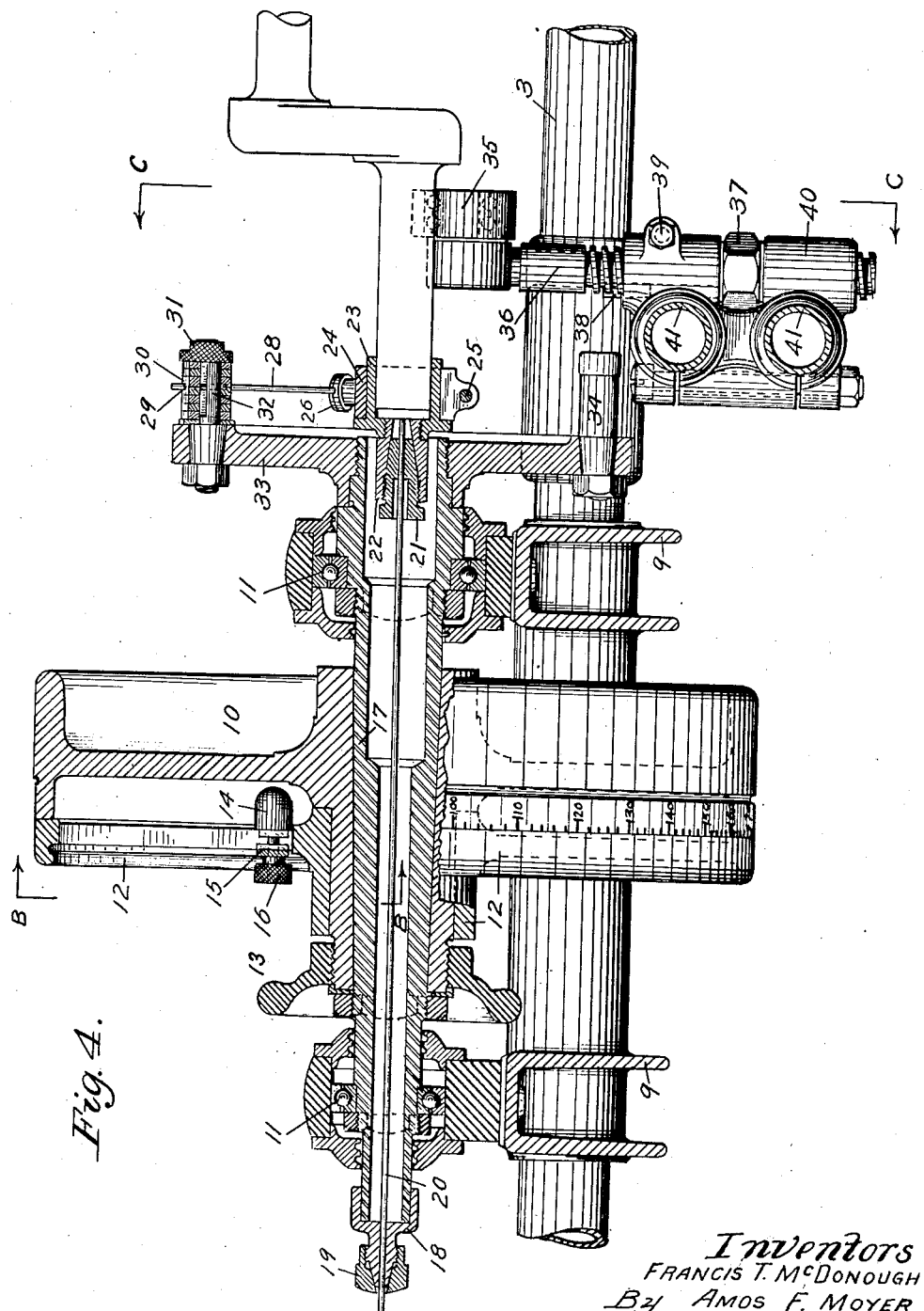

Patented June 30, 1931

1,812,353

UNITED STATES PATENT OFFICE

FRANCIS T. McDONOUGH, OF MADISON, WISCONSIN, AND AMOS F. MOYER, OF MINNEAPOLIS, MINNESOTA, ASSIGNORS, BY MESNE ASSIGNMENTS, TO PRECISION BALANCING MACHINE COMPANY, A CORPORATION OF WISCONSIN

BALANCING MACHINE

REISSUED

Application filed May 2, 1924, Serial No. 710,595. Renewed October 21, 1927.

The balancing machine of our invention and shown herewith is of a type adapted to make determination of unbalance to be corrected by application or removal of weight at determinate angular positions in each of two arbitrarily selected planes of the work, establishing thereby complete dynamic balance, including static balance. Disclosures are herein made which would be equally applicable to balancing machines in which static balance is established prior to determining dynamic unbalance. Likewise, the machine of our invention is of the type in which the revolving body is caused to rotate first at a speed higher than the critical speed of the resilient supporting means, and then permitted to revolve freely upon ball bearing supports while the rotative speed gradually diminishes from above to below the critical speed, thereby setting up a maximum amplitude of oscillation of the supporting means as critical speed is passed through, which maximum amplitude is a directly proportionate measure of the unbalance to be determined. Features are also disclosed which would be equally applicable to a machine of constant speed power driven type.

Among the novel features of this invention are: A resilient pivotal mounting of the supporting means which is adjustable as to the supporting strength of the resilient members in accordance with the weight of the work and the natural period or critical speed of oscillation, besides being frictionless in its oscillation save for the internal hysteresis of springs and for atmospheric resistance. A fly wheel and universally adjustable balance weight carried by the supporting means, to which the work may be adjustably aligned, and which by its rotative inertia controls the rate at which the revolving work passes through the critical speed. Frictionless flexible means for connecting without constraint the work, with a source of driving power or flywheel control, including revolving parts through which quantities of counter-balance may be applied. These revolving parts are installed on the machine for the application and positioning of counter-balance equivalent to the correction determined for the work. Frictionless adjustable means for actuating an amplitude indicator from the oscillations of the supporting means. A retaining lock and releasing device for locking the supporting means at the neutral position of rest and releasing same without jar or false disturbance when amplitudes of oscillation are to be observed.

In general arrangement the machine consists of a base on which is pivotally mounted a rectangular frame or supporting means capable of oscillation under spring restraint. At one end of said frame is a headstock carrying a ball bearing fly wheel and correction disk, while intervening between said headstock, and the pivotal support is a cross member with the two adjustable ball bearing rollers to support the adjacent end of the work. Beyond said pivots is a similar cross member with adjustable rollers to support the overhanging end, of the work. All of these members, namely, the headstock and two cross supporting members, are longitudinally adjustable to permit bringing an arbitrarily selected transverse plane of the work into coincidence with the pivots, a procedure essential to direct measurement of the correction required in each of two arbitrarily selected planes of the work. A second transverse plane of the work may be brought into coincidence with the pivots either by longitudinal movement of the members on the frame or by interchanging the two ends of the work. In detail arrangement this machine represents only one of many possible constructions, and the specific reference to the relative location of parts is here given for reference purposes only, or to signify a preferred construction, In the several views of the drawings like characters have been used to designate identical parts.

Figure 1 is a front elevation of the complete machine empty of work.

Figure 2 is a plan view of the complete machine showing a crankshaft in place as work to be balanced.

Figure 3 is an elevation taken from the left of Figure 1.

Figure 4 is a section taken on the line AA of Figure 2.

Figure 5 is a section and partial elevation taken on line BB of Figure 4.

Figure 6 is an elevation and partial section taken on the line CC of Figure 4.

Figure 7 is a partial section shown in perspective taken on the line DD of Figure 2.

Figure 8 is a rear quarter perspective taken from position EE of Figure 1.

Referring to Figure 1, 1 is the base on which is the supporting member 1ª. Clamped to the supporting member, 1ª, in transverse alignment, are two plate spring pivots 2, to the upper edge of which are clamped supporting members 3ª which carry the rectangular frame 3. The right extremity of frame 3 is adjustably connected by a screw 4 to a goose-neck spring 5 carried on the free end of a cantilever spring 6. The left end of the spring 6 is attached to the left supporting member 1ᵇ and at an intermediate point the spring 6 is secured by clamp blocks 7 and 7ª to a slide 8, the free length of the spring 6 which lies to the right of the blocks 7 being adjustable by varying the longitudinal position of blocks 7 upon a slide 8. By means of this construction and arrangement the natural vibratory period, or critical speed, of frame 3 may be varied at will, since the shorter the free length of the spring 6, the more rapid will be the vibratory period of the frame 3, and the longer the free length of the spring 6 the more slow will be the vibratory period or critical speed. The adjustability of critical speed is of particular advantage when changing the set-up of the machine to a piece of work of different weight, for an increase in weight of the work overhanging the pivots will cause a slower critical speed, so that without this adjustment a different spring would be required for every setup, in order to arrive at the same critical speed. Also the required adjustment to increase a critical speed thus reduced by an addition of weight will be a shortening of the cantilever length of spring 6, which at the same time will increase the strength of the spring to support the additional weight. The machine is, therefore, adapted to a wide variety in the weight of work. Since the total support of frame 3 is effected through springs 2, 5 and 6, which have all joints securely clamped and no mechanically journalled connection, there is no frictional resistance to oscillation, other than atmospheric resistance, and internal hysteresis of the springs. The latter hysteresis of springs is smaller than the friction of any known mechanical pivot or journal, and the sensitiveness of the machine to small amounts of unbalance is accordingly very great, in view also of the light weight construction of the oscillating frame which is designed for necessary mechanical strength only, and not for rigid alignment of parts. The elimination of friction in the oscillation of the frame is essential in order that amplitudes of oscillation may be directly proportionate measures of amounts of unbalance.

Longitudinally adjustable at the left end of the frame 3 is a headstock frame 9 which carries a flywheel 10 supported in ball bearing journals 11, shown in Figure 4. Rotatably mounted on the hub of flywheel 10 is a correction disk 12 which is locked against relative movement upon 10 by means of the threaded clamping wheel 13. The web of disk 12 is slotted radially to receive the adjustable weight 14, vernier, block 15 and clamping knob 16, the combined weight of which is carefully standardized so that upon movement of this assembly a known radial distance will correspond to a known quantity of unbalance. For example, a weight of ten ounces moved one inch represents a change in balance, or a quantity of unbalance equal to ten ounce-inches.

In Figure 5 are seen a clamping knob 16 and a vernier block 15, which is movable radially adjacent to graduated scale 12ª. Block 15 carries graduation forming ten equal divisions having a total combined length equal to nine divisions on scale 12ª, thus affording vernier readings of position within one-tenth of the smallest divisions on scale 12ª. With the weight set at the inner position or zero reading, disk 12 is in perfect independent balance and can be turned to any angular position with respect to flywheel 10 without upsetting this condition. Flywheel 10, together with all other members mounted to revolve on journals 11 are also in perfect balance. Radial adjustment of weight assembly, 14, 15, 16 combined with angular adjustment of disk permits the application of balance corrections of any desired magnitude or angular position. Should the magnitude of the desired correction be greater than permitted by the outer extremity of the adjusting slot, two threaded openings 12ᵇ are provided, in which may be inserted equal known weights permitting assembly 14, 15, 16 to be set back to zero, and thence proceeding by addition as with the rider on a scale beam after adding weights to the pan.

The periphery of flywheel 10 is graduated with angular divisions referring to an index point on the rim of the disk 12, so that any desired angular position for disk 12 may be readily set off.

For purposes of setting the revolving work into motion, as for example by hand or power friction applied to flywheel 10, and in order that the inertia of said flywheel may be transmitted to the work, said flywheel is rigidly mounted on tubular shaft 17 journaled in ball bearings 11 and connection is made to the work as follows. At the left end of the shaft 17 is a tapered soft collet 18 which by means of nut 19 engages the internal shaft 20, passing through the tubular shaft 17.

The right hand end of the shaft 20 is engaged by means of threaded collet 21 and hub 22 to a cup 23, the split sides of which engage the work by means of clamp collar 24, which is locked by screw 25. Shaft 20 is purposely made slender and of considerable length in order to be as flexible as possible, being preferably of spring material so as to permit slight flexure between the work and the headstock without restraint upon the bearings. In order to prevent torsional vibration between the work and the flywheel, which otherwise would occur through the elasticity of the shaft 20, a tangential driver 28 is engaged to clamp the collar 24 by means of a grooved washer 26 and a nut 27, and at the other end is engaged by means of beveled washers 29 and 30 and a nut 31 to pin 32 set in the face plate 33, which is in turn rigidly mounted on the shaft 17. The parts upon the pin 32 are counterbalanced by the pin 34, and a collar 24 is perfectly balanced with the driver 28 engaged. Driver 28 is also as slender and flexible as requirements will permit, and is preferably of spring material.

The work is carried upon four ball bearting rollers 35, each of which has independent vertical adjustment by means of a screw 36 and a nut 37, being guided by a key 38 and locked by clamp screws 39 to the supports 40, which are separately adjustable on cross members 41. The four screws 36 are adjusted to place the rotative axis of the work in alignment with the rotative axis of the shaft 17 when the frame 3 is at rest. Internal shaft 20 and a driver 28 are then engaged without strain so that the only forces acting upon the frame 3 are the forces of unbalance in the revolving bodies.

In order that the maximum amplitude of oscillations taken as critical speed is passed through may be a directly proportionate measure of the amount of unbalance, it is necessary that the frame 3 be locked against oscillation during the time that the revolving parts are set in motion at a speed above critical speed, and that the frame 3 be thereupon released from a truly neutral position of rest and permitted to act without interference or false jar under the disturbing forces of unbalance only. A gradually receding touch of the hand or finger will serve the purpose, but mechanism means for effecting the result are shown in Figure 7. Upon the left cross member of the frame 3 is a forked member 42 adjustably locked in position by a clamp bolt 43. Upon the transverse faces of the depending forked portions of 42 are mounted four spring members 44 so attached to 42 at their upper ends that the lower ends diverge from a position of contact with said forces unless forced into contact by the application of a transverse pressure. Parallel with said member of the frame 3 and passing between the forked portions of 42 is a shaft 45 upon which are screw threads 46 and 47 respectively of right hand and left hand pitch. Engaging these threads respectively are threaded clamp jaws 48 and 49, which are slidably guided on a pin 50. A clockwise turning of shaft 45 will therefore cause the blocks 48 and 49 to move toward each other, while a counter clockwise turning of shaft 45 will cause a reversed movement.

In order that frame 3 may oscillate without friction jaws 48 and 49 must separate sufficiently to remain completely out of contact with springs 44, collar 51 being employed to limit excessive movement in this direction, and to guide the operator in obtaining the correct position of freedom. When there is no disturbing force acting upon the frame 3, any residual of vibratory oscillation may be readily damped out with this device by bringing jaws 48 and 49 into contact with springs 44 and gradually receding to a position of no contact. The gradually diminishing friction between the contacting surfaces will thus bring frame 3 to rest at the neutral position. In order that this process may be most effective, it is desirable that the contacting faces of springs 44 and jaws 48 and 49 be well smoothed and highly polished. Frame 3 is locked by bringing jaws 48 and 49 forcibly together to clamp members 44 and 42 as in a vice. Shaft 45 is actuated by a lever 53 seen in Figures 1, 2 and 3.

Proportionality of observed amplitudes of oscillation is of prime importance in the process employed on this machine, and since the obtaining of proportionality between such amplitudes and quantities of unbalance necessitates the absence or a very great reduction of frictional resistance to oscillation, an amplitude indicator is required which consumes the smallest possible energy in friction, and at the same time gives visual indications or readings of suitable proportionate size for numerical interpretation of the smallest quantities to be dealt with in practice. Likewise the largest amplitudes to be encountered must be within the range of observable readings on the indicator, and an adjustment of the indicator permitting a variation of the scale of the readings will be useful in that the movement of the indicator hand when observing large amplitudes of oscillation need not be so great in linear velocity as to render observations both difficult and inaccurate.

Figure 8 shows the mounting of an indicator of the type employed by machinists for observing the accuracy of metal parts; such an indicator, if possessing small frictional resistance, being adapted to the purpose because of the small necessary motion of the actuating parts and consequent small energy of friction. By the mounting here shown, the indicator is placed in a position convenient to careful observation by the operator, and is provided with an adjustment permitting variation of the scale of readings. 54 is a column supported on pedestal 10 of the base and carrying head 55. Clamped horizontally to 55 is a leaf spring 56 which when free is so upwardly curved that upon being drawn down by the wire 57 and attached to the frame 3 at its neutral position of rest, it has a position and contour when so restrained, which is substantially horizontal and straight. Vertical oscillation of the frame 3 will then be accompanied by a proportionate vertical movement of all portions of the free length of the spring 56, the magnitude of such movement being greatly diminished as the point considered approaches nearer the point of rigid attachment between the spring 56 and the head 55. Also carried by the head 55 on the column 54 is an arm 58 mounting a rod 59, upon which is slidably mounted a support 60 which may be locked in position by means of a thumb screw 61. The indicator 62 is mounted upon a support 60 with its actuating ball point 63 resting upon the spring 56 so that oscillation of the frame 3 and spring 56 are indicated by movement of the dial hand of indicator 62, which is at the obverse side as seen in Figure 8. By virtue of substantial parallelism between spring 56 and rod 59, the support 60 may so be moved along the rod 59 as to vary the proportionate oscillations of the ball 63 and hence to change the scale of movement shown by the dial hand of indicator 62. Adjustable stop collars 64 and 65 may be set at determined positions on rod 59 representing two locations of indicator 62 which may be found adapted to two varieties of work, or differing from each other by a predetermined ratio between the scales of movement observed at the indicator dial hand. For example, when support 60 is adjusted to the limiting position in contact with collar 64, the movement of the dial hand on indicator 62 for a given amplitude of oscillation of the frame 3 corresponding to a given amount of unbalance may be exactly one-tenth of the corresponding movement of the dial hand when support 60 is in contact with the collar 65. The latter position of indicator 62 is accordingly adapted to observing small quantities of unbalance, and the former to observing large quantities of unbalance, and the proportional relationship between quantities of unbalance and observed amplitudes may be readily retained numerically by proper positioning of the decimal point.

We claim as our invention:

1. In a machine for balancing rotative bodies, having a resiliently mounted supporting means, a spring comprising a portion of the resilient mounting, and means for adjusting said spring as to the active length of elastic material between a point of fixed support and the point of attachment of said spring to said supporting means.

2. In a balancing machine with a movable support for the revolving body, a spring of the cantilever type sustaining said support, said spring having an adjustable clamp movable along the length thereof and adapted to lock a portion of said spring in a stationary position with a variable overhanging length free to yield in sustaining said movable support for the revolving body.

3. In a balancing machine with a support for the revolving body mounted to vibrate, a frictionless elastic supporting means with adjustable ratio between force increment and deflection increment, thereby adjusting the frequency of resonant vibration and the critical speed of the revolving body upon the supporting means.

4. In a balancing machine with support for the revolving body mounted to vibrate, a plate spring mounting permitting vibration substantially pivotal, a cantilever type spring with adjustable free length connected to said support by a rigidly attached spring flexing member; said plate spring mounting and said spring flexing member constituting the entire mounting of said support for the revolving body.

5. In a balancing machine in which the test body is mounted to revolve on anti-friction bearings under the driving power of inertia only, while passing through a desired speed of observation, an anti-friction mounted flywheel connected to control the rate of retardation of the test body.

6. In a balancing machine in which the test body is mounted to revolve without power on pivoted supporting means, a flywheel on said supporting means and connected to revolve at identical speed with said test body, and a revolving weight adjustable with respect to said flywheel for the application of known quantities of unbalance at known positions, all of said revolving parts supported on anti-friction bearings.

7. In a balancing machine with pivotally mounted support for the test body, a separately journaled shaft upon said support in substantial alignment with the test body, said shaft carrying an adjustable weight for the application of known quantities of unbalance at known positions, means comprising a flexible tangential driving member to interconnect said test body and said shaft, and means to prevent end flotation of the revolving parts.

8. In a balancing machine with pivotally mounted support for the revolving test body, a flywheel, separately journaled to revolve upon said support in substantial alignment with said test body, a revolving weight adjustable with respect to said flywheel for the application of known quantities of unbalance at known positions, and connecting means comprising a flexible shaft and a flexible tangential driving member to interconnect said flywheel and said test body, all of said revolving parts being mounted on anti-friction bearings.

9. In a balancing machine with pivotally mounted support for the test body, a locking and releasing device for said support comprising locking jaws parallel to the plane of oscillation of said supporting means, and resilient members interposed between said jaws capable of producing variable friction reducible to zero.

10. In a balancing machine with pivotally mounted support for the test body, of a leaf spring connected with the support and flexed by oscillations of the support, and an oscillation amplitude indicator arranged to be actuated by said leaf spring.

11. In a balancing machine the combination with a pivotally mounted support for the test body, of a separately mounted member actuated from the test body support and possessing a point of zero movement and a graduated oscillatory amplitude indicator operative from a point on said actuated member at a variable distance from said point of zero movement whereby the oscillations of the test body support may be read on said indicator at an adjustable ratio between the movements of said support and the movements of said indicator.

12. In a balancing machine, the combination with an oscillatory support pivoted in one of the two transverse planes selected for balancing corrections of the revolving test body carried thereon with means for measuring amounts of unbalance by amplitudes of oscillation, of revolving means on said support separate from the test body adapted for applying a predetermined amount of unbalance at a predetermined position, thereby producing the same resultant effect on the oscillatory support as would the required balancing correction if applied in the other of the two transverse planes for balancing of the test body, whereby the system may revolve without oscillation of said support.

13. In a balancing machine the combination with a support mounted to oscillate about a pivot in a plane transverse to the rotational axis of a test body on said support with means for measuring amounts of unbalance by amplitudes of oscillation; of revolving means also on the support but axially displaced from the pivot and from the transverse plane of the test body for which the required balancing correction is being determined, adapted to apply a predetermined amount of unbalance and to locate the same in predetermined angular relation to the revolving test body, to produce the same resultant effect on the support as would the required correction if applied in that transverse plane of the test body for which the determination is being made.

14. A balancing machine comprising an oscillating frame having ways parallel to the rotational axis and perpendicular to the pivotal axis; supports adjustable on said ways at opposite sides of the pivotal axis and adapted to carry a revolving test body with a selected transverse correction plane of the test body containing the pivotal axis; a headstock also adjustable on said ways and carrying coaxial revolving parts connected to the test body which are adapted for applying a determined amount of unbalance and for locating it at a determined angle with respect to the revolving test body.

15. In a balancing machine the combination with an oscillatory support pivoted transversely to the axis of the revolving test body, of means revolving coaxially with the test body for applying and locating balancing corrections and disposed at the opposite side of the pivots from the selected plane of the test body for which a correction is being determined.

16. In a balancing machine, a support for a revolving test body, said support mounted to oscillate about a pivotal axis, a spring adapted to influence the oscillations of said support, and adjustable means cooperative with said spring and support for controlling the neutral position of the support.

17. In a balancing machine having a mounting for a revolving test body, said mounting being carried upon a cantilever spring of adjustable length and upon pivots permitting oscillation, and means co-operative with said cantilever spring for adjusting the neutral position of said mounting, with the test body thereon.

18. In a balancing machine for revolving bodies, the combination with a bed, a support for the body to be balanced mounted to oscillate on the bed and provided with means by which said body may be carried while being free to revolve, means on said support arranged to be connected to the body to be operated, said means being adapted to have power applied thereto for revolving said body, means to lock said support against oscillation while said body is being revolved and to release said support after the body to be tested has been set in motion, thereafter permitting the body to revolve and the support to oscillate without mechanical interference.

19. A balancing machine having a support for a revolving test body, the said support mounted to oscillate about a pivotal axis, a spring connected to the support in a manner to influence oscillations thereof, and adjustable means connected to the spring to cause said support to assume a desired neutral position when under static load, as registered by an indicator.

20. In a balancing machine a base, a work support, a plate spring connection between base and support adapted to permit substantially pivotal vibration of the support, a cantilever spring connected to the base and to the work support, said plate spring and cantilever spring constituting the sole connection between the base and support.

21. In a balancing machine a work support adapted to oscillate, a cantilever spring having its free end connected to the rockable frame in such manner that the natural vibratory period of the frame may be varied by varying the effective length of the cantilever portion of the spring, the entire support and connection of the work support with the cantilever spring being effected by means whereby there is substantially no frictional resistance to oscillation, and means arranged upon the work support for rotating work on an axis extending lengthwise of the spring and means for adjusting the work frame with respect to the free end of the cantilever spring.

22. In a balancing machine, a work support mounted to oscillate about a pivot, a spring independently mounted to influence the oscillations thereof, and connections between said work support and spring for adjusting the neutral position of the support.

23. In a balancing machine, a work support connected by a resilient plate to rock, and a cantilever spring having its free end connected to the work support in such manner that the natural vibratory period of the frame may be varied by varying the effective length of the cantilever portion of the spring.

24. In a machine for balancing rotative bodies, a resiliently mounted supporting means, and means for adjusting the resilient mounting for controlling the natural period of oscillation of said supporting means with the body to be tested thereon.

25. The combination in a machine for balancing rotative bodies, with an oscillating frame, and means for revolubly supporting a body to be tested upon said frame, of a spring of adjustable free length connected to the oscillating frame and to a suitable support.

26. The combination, in a balancing machine, with an oscillating frame provided with revoluble means for holding the body to be tested, of a spring of adjustable free length forming a connection between the oscillating frame and a point of fixed support.

27. In a balancing machine, the combination of a frame mounted to oscillate, a spring for controlling such operation, a clamp engaging said controlling spring adjustable to secure a portion of said spring relatively stationary, and permit a variable portion thereof to flex with the oscillations of the frame.

28. In a balancing machine with a frame supporting and revolving body mounted to vibrate, a mounting for said frame comprising plate springs permitting vibration substantially pivotal, and a spring with adjustable length of elastic material between its connection to said frame and a fixed support.

29. A balancing machine for revolving bodies having the combination of a support for the body, plate spring mountings for said support permitting vibration substantially pivotal, a spring controlling the natural period of free vibration, locking means permitting said support to be released or locked against vibration, and resilient friction members cooperative with said locking means, whereby the locking means may be released, accompanied by gradual reduction of friction.

30. The combination, in a machine for balancing rotative bodies, with an oscillating frame, and means for revolubly supporting a body to be tested upon said frame, of a cantilever spring of adjustable free length connected to a fixed support, and provided with a resilient connection to said oscillating frame.

31. In a balancing machine the combination with a support for a revolving body of a cantilever spring of adjustable free length having a resilient connection with the support.

32. In a balancing machine, a support for a revolving body carried upon a cantilever spring, said cantilever spring being secured by a clamp adjustable along its length to a fixed member, and resiliently connected to the said support for the revolving body.

33. In a balancing machine with support for the revolving body, clamping means having surfaces parallel to the natural direction of vibration of the support, a retaining member secured to the support, means to exert or release a pressure between said clamping surfaces and retaining member, and resilient means interposed therebetween, whereby the frictional damping to vibration may be gradually diminished as said clamping means are released.

34. In a balancing machine with oscillatory support for the revolving body, clamping means having surfaces parallel to the natural direction of oscillation of said support, resilient means secured to said support and extending between said clamping surfaces, and means to exert or release a pressure between said clamping surfaces and resilient means, whereby the frictional damping to vibration may be gradually diminished as said clamping means are released.

In witness whereof, I have hereunto set my hand this 29th day of April, 1924.

AMOS F. MOYER.

In witness whereof, I have hereunto set my hand this 26th day of April, 1924.

FRANCIS T. McDONOUGH.